Patented June 23, 1931

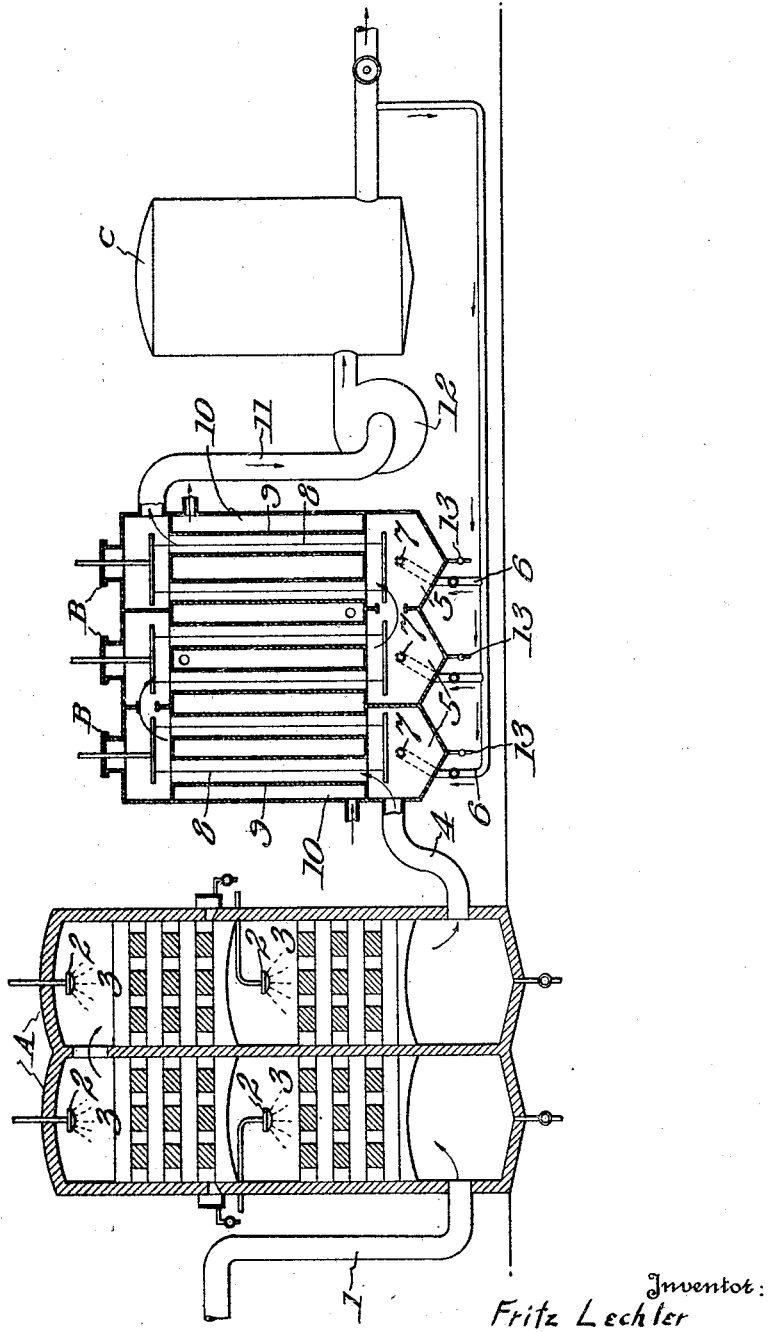

1,811,797

UNITED STATES PATENT OFFICE

FRITZ LECHLER, OF FRANKFORT-ON-THE-MAIN, GERMANY

PROCESS FOR THE PRODUCTION OF SULPHURIC ACID AND OLEUM BY THE CONTACT PROCESS

Application filed June 14, 1928, Serial No. 285,418, and in Germany July 7, 1927.

The present invention relates to the production of sulphuric acid and oleum by the contact process, and particularly to an improved process for the purification of sulfur dioxide-containing gases for the contact process of making sulphuric anhydride.

In the production of sulphuric acid and oleum by the contact process, the sulfur dioxide-containing gases, before passing into the contact apparatus, must be submitted to (1) suitable cooling, (2) careful purification from contact poisons, (3) thorough drying, and (4) separation of the sulphuric acid mist picked up by the gases in drying. All of these operations have hitherto been separately carried out. These various treatments are necessary in order to obtain a complete reaction, to avoid poisoning the contact substances by impurities, and to produce a pure acid.

It is known that for the exhaustive removal of contact poisons, such as arsenic acid, which are present in the gases as suspended particles, so called nuclei in the form of aqueous mists must be produced in the gases, which pick up the last traces of impurities and are thereafter separated from the gases in an electrical field. Heretofore the purification was either effected by adding water and sulphuric anhydride to the gases to be purified or a mist in the form of droplets of water and sulphuric acid was produced in the gases by gradual cooling of the gases by means of acid of decreasing strength. In either case more or less water was added to the gases which had later to be removed in a special cumbersome drying apparatus.

I have discovered a new method of carrying out the process in which the various processes above mentioned are grouped together with other processes and are so interconnected that it becomes possible to carry out the processes of cooling, separation of contact poisons, drying, absorption and prewarming simultaneously, whereby the process of separating the droplets of acid used for drying the gases is wholly eliminated.

The preparation of the gases for the contact apparatus by my new process can be carried out in two stages, a preliminary treatment and a final treatment. In the preliminary treatment the gas is directly sprayed with sulphuric acid of increasing strength, for instance, first the gases are contacted with acid of 55° Bé., then with acid of 58° Bé., and finally with acid of 60° Bé. In this way a part of the water necessary for mist formation is added to the gases in the form of dilute acid during the preliminary treatment. In the further course of the preliminary treatment a partial drying of the gases occurs by spraying with acid of higher strength, whereby at the same time a part of the contact poisons picked up by the mist particles are separated.

The gas thus pretreated by cooling, separation of suspended particles and drying is now converted into a gas suitable for use in the contact apparatus by the so-called final treatment, that is, in the electrical arsenic separating apparatus. This second part of the equipment, which is essentially an electrical precipitation apparatus, is so constructed that it acts as an indirect cooler, the electrical precipitation apparatus being enclosed in a cooling space, by means of which the proper cooling is attained without the aid of any further cooling devices.

In order to simultaneously effect the absolute purification of the gases, sulphuric anhydride ($SO_3$) is passed into the electrical precipitation chamber where it avidly combines with the moisture still remaining in the gas to form a mist.

The addition of the sulphuric anhydride-containing gases is so regulated that all of the water is completely converted to sulphuric acid mist. The mist thus produced is then precipitated by the electrical apparatus.

By this method moisture is eliminated from the gas together with the last traces of arsenic and other suspended matter, so that the spraying with concentrated sulphuric acid, which would otherwise be necessary, as well as the removal of the droplets of drying acid, is rendered wholly unnecessary. The construction of the large apparatus required for these operations is thus avoided.

It is advantageous to draw off from the contact converter of the plant the sulfur trioxide gas necessary for drying and mist formation. Since this is precipitated in the form of sulphuric acid mist, the otherwise necessary absorption of a part of the sulfur trioxide produced is avoided. By proper regulation of the introduction of sulfur trioxide high strength sulphuric acid or even oleum can be obtained as a precipitation product.

The introduction and regulation of the sulfur trioxide may be effected by steps in several places. In this way the content of contact poisons in the gases decreases in the direction of the flow of the gas. Correspondingly the precipitated acid can be removed at different places in grades of different acidity and purity.

In this way in the last section of the precipitation apparatus, into which the greatest amount of sulfur trioxide is advantageously introduced, a condensate may be produced, which may be considered to be completely pure and especially to be free from arsenic.

The direct introduction of the sulfur trioxide from the contact converter has also the advantage, that, particularly at the end of the precipitating apparatus, the temperature of the sulfur dioxide-containing gases may be so controlled, by taking advantage of the sensible heat of the sulfur trioxide gases and of the heat of reaction set free when the sulfur trioxide combines with water, that the sulfur dioxide gases pass to the contact apparatus properly preheated. Since in this way even the preheating takes place in the electrical precipitation apparatus, there is a still further simplification of the apparatus.

By way of example, one embodiment of the invention is illustrated in the accompanying drawing.

In the drawing A represents the apparatus for the preliminary treatment, B the apparatus for the final treatment, and C the contact converter.

The sulfur dioxide-containing gases enter the apparatus A by pipe 1. In this apparatus they are sprayed with sulphuric acid by means of sprayers 2, the acid sprayed in each successive compartment 3 of apparatus A being of increasing strength.

From apparatus A the preliminarily treated sulfur-dioxide containing gases pass to apparatus B by means of pipe 4. Sulphuric anhydride is introduced into the several compartments 5 of apparatus B by means of pipes 6 and ports 7. The mist produced by the interaction of the sulphuric anhydride and the moisture still remaining in the gases is precipitated by means of the electrical precipitators of the known type represented by electrodes 8 and 9.

The apparatus B is cooled by means of air or other cooling fluid circulated through the cooling space 10.

The completely purified gases are now conducted to the contact converter C by means of pipe 11 and blower 12.

The sulphuric acid or oleum produced in the several compartments of apparatus B may be drawn off through pipes 13.

I claim:

1. A process for preparing sulfur dioxide-containing gases for conversion into sulphuric acid and oleum by the contact process which comprises first contacting the gases with a series of sprays of sulphuric acid of successively greater strength up to a strength at which an appreciable amount of water is left in the gases, and thereafter, without any further treatment of the gases with sulphuric acid sprays, introducing sulfur trioxide into the gases and simultaneously subjecting the gases to the action of an electrical potential and to indirect cooling to remove the remaining amounts of water and other impurities.

2. A process for preparing sulfur dioxide-containing gases for conversion into sulphuric acid and oleum by the contact process which comprises first contacting the gases with a series of sprays of sulphuric acid of successively greater strength up to a strength at which an appreciable amount of water is left in the gases, and thereafter, without any further treatment of the gases with sulphuric acid sprays, introducing sulfur trioxide directly from the contact converter into the gases and simultaneously subjecting the gases to the action of an electrical potential and to indirect cooling to remove the remaining amounts of water and other impurities.

3. A process for preparing sulfur dioxide-containing gases for conversion into sulphuric acid and oleum by the contact process which comprises first contacting the gases with a series of sprays of suphuric acid of successively greater strength up to a strength at which an appreciable amount of water is left in the gases, and thereafter, without any further treatment of the gases with sulphuric acid sprays, introducing sulfur trioxide into the gases and simultaneously subjecting the gases to the action of an electrical potential and to indirect cooling to remove the remaining amounts of water and other impurities, the sulfur trioxide being introduced into the sulfur dioxide-containing gases in a plurality of stages.

4. A process for preparing sulfur dioxide-containing gases for conversion into sulphuric acid and oleum by the contact process which comprises first contacting the gases with a series of sprays of sulphuric acid of successively greater strength, and thereafter, without any further treatment of the gases with sulphuric acid sprays, introducing sulfur trioxide into the gases and simultaneously subjecting the gases to the action of an electrical potential and to indirect cooling to remove the remaining amounts of water and other impurities, the sulfur trioxide being introduced into the sulfur dioxide-containing gases in a plurality of stages, the greater portion of the sulfur trioxide being added in the last stage.

5. A process for preparing sulfur dioxide-containing gases for conversion into sulphuric acid and oleum by the contact process which comprises first contacting the gases with a series of sprays of sulphuric acid of successively greater strength, and thereafter, without any further treatment of the gases with sulphuric acid sprays, introducing sulfur trioxide into the gases and simultaneously subjecting the gases to the action of an electrical potential and to indirect cooling to remove the remaining amounts of water and other impurities, the sulfur trioxide being introduced into the sulfur dioxide-containing gases in a plurality of stages, the sulfur dioxide-containing gases being pre-warmed by the addition of sufficiently large quantities of sulfur trioxide directly from the converter in the last stage.

In testimony whereof, I affix my signature.

FRITZ LECHLER.